United States Patent [19]

Winner et al.

[11] Patent Number: 5,583,974
[45] Date of Patent: Dec. 10, 1996

[54] COMPUTER GRAPHICS SYSTEM HAVING HIGH PERFORMANCE MULTIPLE LAYER Z-BUFFER

[75] Inventors: Stephanie L. Winner, Santa Clara; Michael W. Kelley, San Mateo, both of Calif.

[73] Assignee: Apple Computer, Inc., Cupertino, Calif.

[21] Appl. No.: 237,639

[22] Filed: May 4, 1994

Related U.S. Application Data

[63] Continuation-in-part of Ser. No. 060,299, May 10, 1993, abandoned.

[51] Int. Cl.[6] ............................................. G06T 15/40
[52] U.S. Cl. ............................................. 395/122; 395/135
[58] Field of Search ................................. 395/122, 124, 395/135; 345/113–114; 377/51; 364/239.6

[56] References Cited

U.S. PATENT DOCUMENTS

| | | | |
|---|---|---|---|
| 4,475,104 | 10/1984 | Shen | 340/729 |
| 4,594,673 | 6/1986 | Holly | 364/522 |
| 4,658,247 | 4/1987 | Gharachorloo | 340/747 |
| 4,697,178 | 9/1987 | Heckel | 340/729 |
| 4,815,009 | 3/1989 | Blatin | 364/518 |
| 4,866,637 | 9/1989 | Gonzalez-Lopez et al. | 364/518 |
| 4,885,703 | 12/1989 | Deering | 364/522 |
| 4,897,803 | 1/1990 | Calarco et al. | 364/518 |
| 4,924,414 | 5/1990 | Ueda | 395/122 |
| 4,945,500 | 7/1990 | Deering | 364/522 |
| 4,954,818 | 9/1990 | Nakane et al. | 340/721 |
| 4,970,499 | 11/1990 | Ryherd et al. | 340/729 |
| 4,970,636 | 11/1990 | Snodgrass et al. | 364/518 |
| 5,001,651 | 3/1991 | Rehme et al. | 364/518 |
| 5,027,292 | 6/1991 | Rossignac et al. | 395/122 |
| 5,081,698 | 1/1992 | Kohn | 395/122 |
| 5,081,700 | 1/1992 | Crozier | 395/150 |
| 5,101,365 | 3/1992 | Westberg et al. | 395/158 |
| 5,115,402 | 5/1992 | Matsushiro et al. | 395/141 |
| 5,121,493 | 6/1992 | Ferguson | 395/600 |
| 5,123,085 | 6/1992 | Wells et al. | 395/121 |
| 5,128,872 | 7/1992 | Malachowsky et al. | 395/162 |
| 5,157,388 | 10/1992 | Kohn | 340/800 |
| 5,159,663 | 10/1992 | Wake | 395/122 |
| 5,214,753 | 5/1993 | Lee et al. | 395/125 |
| 5,222,204 | 6/1993 | Swanson | 395/127 |

(List continued on next page.)

FOREIGN PATENT DOCUMENTS 527587A  2/1993  European Pat. Off. .

OTHER PUBLICATIONS

Horowitz and Sahni, Fundamentals of Data Structures in Pascal, 1994, p. 382–403, 433–467, 474–491.

Mammen et al., Rendering Transparency and Antialiasing Algorithms Implemented with the Virtual Pixel Maps Technique, Computer Graphics & Applications, Jul. 1989, pp. 43–55.

(List continued on next page.)

*Primary Examiner*—Mark K. Zimmerman
*Assistant Examiner*—Anton W. Fetting
*Attorney, Agent, or Firm*—Blakely, Sokoloff,Taylor & Zafman

[57] ABSTRACT

A method and apparatus for retaining objects having equal Z-values. 1. A method of retaining objects having equal Z-values in a Z-buffer. The Z-buffer includes a first object. The method comprises the steps of: a) receiving a second object having a second Z-value; b) generating a second tag for the second object; c) storing the second object and the second tag in the Z-buffer; d) receiving a third object causing an overflow (the third object has a Z-value equal to the second Z-value); e) generating a fourth object, the fourth object includes a composite of the first and second objects, the fourth object being stored in the Z-buffer with a fourth tag corresponds to the second tag; f) resubmitting the third object; g) receiving the third object; h) generating a third tag for the third object, and i) storing the third object and the third tag in the Z-buffer responsive to comparing the fourth tag and the third tag.

49 Claims, 12 Drawing Sheets

U.S. PATENT DOCUMENTS

| | | | |
|---|---|---|---|
| 5,249,264 | 9/1993 | Matsumoto | 395/134 |
| 5,253,335 | 10/1993 | Mochizuki et al. | 395/122 |
| 5,261,041 | 11/1993 | Susman | 395/152 |
| 5,268,995 | 12/1993 | Diefendorff et al. | 395/122 |
| 5,278,949 | 1/1994 | Thayer | 395/126 |
| 5,301,263 | 4/1994 | Dowdell | 395/122 |
| 5,307,449 | 4/1994 | Kelley et al. | 395/119 |
| 5,363,475 | 11/1994 | Baker et al. | 395/122 |
| 5,381,518 | 1/1995 | Drebin et al. | 395/135 X |
| 5,428,724 | 6/1995 | Silverbrook | 395/135 |
| 5,446,881 | 10/1995 | Mammel, Jr. et al. | 395/600 |

OTHER PUBLICATIONS

Potmesil et al., The Pixel Machine: A Parallel Image Computer, Computer Graphics, Jul. 1989, pp. 69–78.

Molnar et al., PixelFlow: High Speed Rendering Using Image Composition, Computer Graphics, Jul. 1992, pp. 231–240.

J. D. Foley, A. V. Dam, S. K. Feiner, J. F. Hughes, "Second Edition Computer Graphics Principles And Practice", 1990, pp. 885, 886, 899 & 900.

L. Williams, "Pyramidal Parametrics", Computer Graphics vol. 17, No. 3, Jul. 1993, pp. 1–11.

M. Oka, K. Tsutsui, A. Ohba, Y. Kurauchi, T. Tago, "Real–Time Manipulation Of Texture–Mapped Surfaces", Computer Graphics, vol. 21, No. 4, Jul. 1987, pp. 181–188

M. Deering, S. Winner, B. Schediwy, C. Duffy, N. Hunt, "The Triangle Processor And Normal Vector Shader: A VLSI System For High Performance Graphics", Computer Graphics, vol. 22, No. 4, Aug. 1988, pp. 21–30.

D. Kirk, D. Voorhies, "The Rendering Architecture Of The DN10000VS", Computer Graphics, vol. 24, No. 4, Aug. 1990, pp. 299–307.

H. Fuchs, J. Poulton, J. Eyles, T. Geer, J. Goldfeather, D. Ellsworth, S. Molnar, G. Turk, Brice Tebbs, L. Israel, "Pixel–Planes 5: A Heterogeneous Multiprocessor Graphics System Using Processor–Enhanced Memories", Computer Graphics, vol. 23, No. 3, Jul. 1989, pp. 79–88.

K. Akeley, T. Jermoluk, "High–Performance Polygon Rendering", Computer Graphics, vol. 22, No. 4, Aug. 1988, pp. 239–246.

Fig. 3

| | ActiveLayers | Example 1<br>incoming object | Layer0 Layer1 • • • Layer8 |
|---|---|---|---|
| before | 0 | | |
| after | 1 | ▊—301 | ▊—301 |

| | ActiveLayers | Example 2<br>incoming object | Layer0 Layer1 • • • Layer8 |
|---|---|---|---|
| before | 1 | | ▊—301 |
| after | 1 | ▊—302 | ▊—302 |

| | ActiveLayers | Example 3<br>incoming object | Layer0 Layer1 • • • Layer8 |
|---|---|---|---|
| before | 1 | | ▊—301 |
| after | 1 | ▊—302 | ▊—301 |

| | ActiveLayers | Example 4<br>incoming object | Layer0 Layer1 • • • Layer8 |
|---|---|---|---|
| before | 1 | | ▊—301 |
| after | 2 | ▨—303 | ▨—303 ▊—301 |

| | ActiveLayers | Example 5<br>incoming object | Layer0 Layer1 • • • Layer8 |
|---|---|---|---|
| before | 1 | | ▊—301 |
| after | 1 | ▨—303 | ▊—301 |

| | ActiveLayers | Example 6<br>incoming object | Layer0 Layer1 • • • Layer8 |
|---|---|---|---|
| before | 1 | | ▨—304 |
| after | 1 | ▊—305 | ▊—305 |

| | ActiveLayers | Example 7<br>incoming object | Layer0 Layer1 • • • Layer8 |
|---|---|---|---|
| before | 1 | | ▨—304 |
| after | 2 | ▊—305 | ▨—304 ▊—305 |

| | ActiveLayers | Example 8<br>incoming object | Layer0 Layer1 • • • Layer8 |
|---|---|---|---|
| before | 1 | | ▨—304 |
| after | 2 | ▨—306 | ▨—306 ▨—305 |

| | ActiveLayers | Example 9<br>incoming object | Layer0 Layer1 • • • Layer8 |
|---|---|---|---|
| before | 1 | | ▨—304 |
| after | 2 | ▨—306 | ▨—304 ▨—306 |

Fig. 4

| Inputs | | | | Outputs | | |
|---|---|---|---|---|---|---|
| Active Layers | incoming object | Insert Pointer | Z-buffer RAM write | Active Layers | Insert Layer | LayerPointer |
| 0 | 401, Z=15 | 0 | <0> = 401, Z=15 | 0 | | 7,6,5,4,3,2,1,0 |
| 1 | 402, Z=10 | 1 | <1> = 402, Z=10 | 1 | 0 | 0,7,6,5,4,3,2,1 |
| 1 | 403, Z=8 | 2 | <2> = 403, Z=8 | 1 | 0 | 1,0,7,6,5,4,3,2 |
| 2 | 404, Z=9 | 3 | <3> = 404, Z=9 | 2 | 0 | 2,1,0,7,6,5,4,3 |
| 3 | 405, Z=11 | 4 | no write | 3 | 1 | 2,3,1,0,7,6,5,4 |
| 3 | 406, Z=5 | 4 | <4> = 406, Z=5 | 3 | none | 2,3,1,0,7,6,5,4 |
| | | | | 1 | 0 | 4,2,3,1,0,7,6,5 |

| INCOMING OBJECTION | | Z-BUFFER STATUS | | | |
|---|---|---|---|---|---|
| | | LAYER 0 | LAYER 1 | LAYER 2 | LAYER 3 |
| 7000 | Initialize | Empty | Empty | Empty | Empty |
| 7010 | Z-Value = 1 | Z-Value = 1 | Empty | Empty | Empty |
| 7015 | Z-Value = 0 | Z-Value = 0 | Z-Tag = 1 | Empty | Empty |
| 7020 | Z-Value = 2 | Z-Value = 0 | Z-Value = 1 | Z-Value = 2 | Empty |
| 7025 | Z-Value = 2 | Z-Value = 0 | Z-Value = 1 | Z-Value = 2 | Z-Value = 2 |
| 7030 | Z-Value = 2  X | Z-Value = 0 | Z-Value = 1 | Z-Value = 2 | Z-Value = 2 |
| 7035 | Composite IC Z-Value=2 | IC Z-Value = 2 | Empty | Empty | Empty |
| 7040 | Re-receive Objects 7010-7025. Discard Objects with Z-Value <= 2 | IC Z-Value = 2 | Empty | Empty | Empty |
| 7045 | Z-Value = 2  X  Discard | IC Z-Value = 2 | Empty | Empty | Empty |

FIGURE 7B

| INCOMING OBJECTION | | Z-BUFFER STATUS | | | |
|---|---|---|---|---|---|
| | | LAYER 0 | LAYER 1 | LAYER 2 | LAYER 3 |
| 900 | Initialize | Empty | Empty | Empty | Empty |
| 910 | Z-Value = 1<br>Tag = .0 | Z-Tag = 1.0 | Empty | Empty | Empty |
| 915 | Z-Value = 0<br>Tag = .0 | Z-Tag = 0.0 | Z-Tag = 1.0 | Empty | Empty |
| 920 | Z-Value = 2<br>Tag = .0 | Z-Tag = 0.0 | Z-Tag = 1.0 | Z-Tag = 2.0 | Empty |
| 925 | Z-Value = 2<br>Tag = .1 | Z-Tag = 0.0 | Z-Tag = 1.0 | Z-Tag = 2.0 | Z-Tag = 2.1 |
| 930 | Z-Value = 2<br>Tag = .2   X | Z-Tag = 0.0 | Z-Tag = 1.0 | Z-Tag = 2.0 | Z-Tag = 2.1 |
| 935 | Composite<br>IC<br>Z-Tag = 2.1 | IC<br>Z-Tag = 2.1 | Empty | Empty | Empty |
| 940 | Re-receive Objects 910-925. Discard Objects with Z-Tag <= 2.1 | IC<br>Z-Tag = 2.1 | Empty | Empty | Empty |
| 945 | Z-Value = 2<br>Tag = .2 | IC<br>Z-Tag = 2.1 | Z-Tag = 2.2 | Empty | Empty |

FIG. 9

| INCOMING OBJECTION | | Z-BUFFER STATUS | | | |
|---|---|---|---|---|---|
| | | LAYER 0 | LAYER 1 | LAYER 2 | LAYER 3 |
| 1100 | Initialize | Empty | Empty | Empty | Empty |
| 1110 | Z-Value = 1 | Z-Value = 1 | Empty | Empty | Empty |
| 1115 | Z-Value = 0 | Z-Value = 0 | Z-Value = 1 | Empty | Empty |
| 1120 | Z-Value = 2 | Z-Value = 0 | Z-Value = 1 | Z-Value = 2 | Empty |
| 1125 | Z-Value = 2 | Z-Value = 0 | Z-Value = 1 | Z-Value = 2 | Z-Value = 2 |
| 1130 | Z-Value = 2   X | Z-Value = 0 | Z-Value = 1 | Z-Value = 2 | Z-Value = 2 |
| 1135 | Composite  IC  Z-Value = 1 | IC Z-Value = 1 | Empty | Empty | Empty |
| 1140 | Re-receive Objects 1110-1125. Discard objects with Z-Value <= 1 | IC Z-Value = 1 | Z-Value = 2 | Z-Value = 2 | Z-Value = 2 |

FIG. 11

COMPUTER GRAPHICS SYSTEM HAVING HIGH PERFORMANCE MULTIPLE LAYER Z-BUFFER

This application is a continuation-in-part of patent application Ser. No. 08/060,299 filed on May 10, 1993, abandoned in favor of a continuation Ser. No. 08/479,827, pending, for "Computer Graphics System Having High Performance Multiple Layer Z-Buffer," by, Stephanie L. Winner and Michael W. Kelley.

BACKGROUND OF THE INVENTION

1. Field of Invention

The present invention pertains to the field of computer graphics display systems. More particularly, the present invention relates to an apparatus and method for a high performance multiple layer Z-buffer in a computer graphics display system.

2. Description of Related Art

One area in which computer systems are finding increased application is in that of the graphical arts. Technological advances in the speed, processing power, and memory of computers coupled with lower costs have made them ideally suited for use in graphical display systems. Computer generated displays enable users to visualize two and three dimensional objects. Users can group the information content of a graphical display much more effectively than if the same information were to be presented in other formats. A picture is worth a thousand words.

Furthermore, computer graphics also provide a natural and fluid interaction between the computer and a user. Changes to a display are input to the computer which then effectuates those desired changes by modifying the display accordingly. This process provides a convenient vehicle for modeling, predicting, and experimenting with various events. And with the development of high resolution display screens, increasingly complex geometric objects can be rendered with greater precision and clarity. Some examples of computer graphics applications include flight simulators for training pilots, computer aided design for aiding engineers and architects, diagnostic medical scanners for doctors, animated pictures in movies and video games, etc.

Basically, a computer graphics system can be broken into three components: a frame buffer, a monitor, and a display controller. The frame buffer is a digital memory for storing the image to be displayed as a series of binary values. The monitor is comprised of a screen having an array of picture elements, known as pixels. Each pixel represents a dot on the screen and can be programmed to a particular color or intensity. Thousands of individual pixels so programmed are used to represent a displayed image. It is these individual pixel values which are stored in the frame buffer. A display controller is an interface used for passing the contents of the frame buffer to the monitor. The display controller reads the data from the display buffer and converts it into a video signal. The video signal is fed to the monitor which displays the image.

Images are repeatedly rendered into the display over and over again, with each new frame representing a new position or shape of the image to be viewed. The image must be repeatedly sent to the monitor in order to maintain a steady picture on the screen. Due to the retentiveness of the human eye, the monitor needs to be refreshed at a minimum of 30 times a second. Otherwise, the display will flicker in a very annoying and distracting manner. In today's computer graphics systems, the refresh frequency is typically around 72 hertz (i.e., 72 times a second). A faster refresh rate produces less flicker. Hence, the duration for displaying an image is relatively small, approximately 1/72 of a second or 14 milliseconds. Given these restraints, it is imperative to speed up the graphics drawing process to avoid sluggish response times and jerky movements of displayed images. Moreover, the faster an image can be drawn, the more information which can be provided to the display. This results in smoother, more dynamic, and crisper images.

Typically, a three-dimensional graphics rendering device that renders images into the frame buffer also stores additional information per pixel (e.g., Alpha, Z, etc.), which is not required by the frame buffer itself. Alpha values represent a blending function. Z-values represent a pixel's distance from the viewer. Typically, small Z-values indicate that the object is close to the observer, whereas large Z-values indicate that the object is further away. This additional Z storage per pixel is typically referred to as a Z-buffer.

By implementing a Z-buffer, usually in the form of DRAMs, Z-values can be stored. The Z-buffer contains distance information which is used in indicating whether one object is displayed in front of or behind another object. In most conventional Z-buffers, a Z-sort operation is performed by comparing the Z-value of incoming data with the Z-value of pre-existing data. If the incoming data is closer (i.e., it has a smaller Z-value), the incoming color data replaces the pre-existing data in the frame buffer, and the old Z-value is replaced by the new Z-value. Otherwise, the incoming dam is discarded. When there is no more incoming data, the Z-sort is complete, and the contents of each frame buffer/Z-buffer location represents the final color/intensity for that particular pixel.

The Z-sort operation is rather straightforward if all of the objects represented by the data are opaque. However, if the object in the buffer is not opaque, it is necessary to retain information about the data which is discarded in order to determine the final color intensity of a pixel. To avoid the loss of the data, many Z-buffer systems require that all of the non-opaque data be rendered after all opaque data has been rendered and that the non-opaque data be rendered in Z sorted order (e.g., closest to furthest). Any non-opaque objects which are behind the opaque object in the buffer are discarded. The remaining non-opaque objects are composited with the data in the frame buffer and the result is stored in the frame buffer so that no requisite information is lost. The composite represents a combination of a data from non-opaque objects. For example, if a blue non-opaque object is composited with a red non-opaque object, the resulting composite object may appear mostly blue, mostly red, or purple. Since the compositing operation must be performed in a specific Z order, the non-opaque objects must be arranged by Z-depth (i.e., either closest to furthest or furthest to closest) before being compared with the Z-value of the data in the buffer.

Unfortunately, this method of rendering non-opaque objects has a number of shortcomings. Sorting the non-opaque objects by Z-value is computationally expensive. Also, this method does not render interpenetrating non-opaque objects correctly; these must be explicitly tested for, and specially processed, further increasing computation. Consequently, performing the Z sort process reduces the amount of time left to actually draw the images which detrimentally impacts the overall display process.

Other systems have been proposed to solve the problem of rendering non-opaque objects which avoid these shortcomings. These systems usually store more than one Z and color value per pixel, allowing some number of the closest non-opaque objects to be saved, and then composited later. However, these systems require a greatly increased number of Z-buffer RAM accesses necessary to maintain and sort the multiple Z-values per pixel. This increases the bandwidth requirements of the Z-buffer memory, reducing performance and/or increasing cost. However, an advantage of this method is that it defers compositing until after the per pixel Z sort is complete, which improves performance by avoiding unnecessary compositing of objects which are later obscured by a closer object.

Therefore, there is a need in prior art computer graphics systems for an apparatus or method which is capable of minimizing the time required to perform Z operations. It would be preferable if such an apparatus or method could defer compositing until after Z sort is completed without losing the data necessary for compositing non-opaque objects. It would also be highly preferable if such a mechanism could minimize the number of DRAM accesses.

SUMMARY OF THE INVENTION

A method and apparatus for retaining objects, having equal Z-values, in a Z-buffer is described. The present invention can be applied to computer graphics systems. A multiple layer Z-buffer containing Z values for each of the pixels is controlled according to the values in two registers which are instanced for each pixel. One register, referred to as the ActiveLayers register, contains a value indicating how many of the layers are occupied with potentially visible object data. The other register, referred to as the LayerPointer register, contains pointer values indicating the memory location to which the data for each layer is stored.

After one frame has completely rendered, the ActiveLayers register is initialized to 0. The first incoming object increments the ActiveLayers register. If a subsequent incoming object falls behind an opaque object it is discarded, regardless of whether it is opaque or not. If the subsequent incoming object is opaque (and is not hidden), the ActiveLayers register is decremented once for each pre-existing object which becomes hidden behind the incoming opaque object. The ActiveLayers register is then incremented to reflect the incoming opaque object. Otherwise, if a subsequent incoming object is non-opaque (and is not hidden), the ActiveLayers register is incremented.

The LayerPointer register contains a number of pointers equal to the number of layers being implemented. Each pointer specifies a unique address. If an incoming object is hidden behind a pre-existing opaque object, the incoming object is discarded, and the LayerPointer register remains unchanged. Otherwise, the layer wherein the incoming object should be inserted is determined. This determination is based on the incoming object's Z-value relative to those Z-values already existing in the buffer. The opacity of the incoming object affects the ActiveLayers register. The data of the incoming object is written to the address specified by a pointer. The pointers are then adjusted accordingly.

In one embodiment, the incoming data is written to the address specified by the pointer corresponding to the last layer. The InsertLayer for the incoming data is determined. The pointer from the last layer is inserted in the InsertLayer. All the pointers of those layers following that of the InsertLayer is shifted one place to the right. The pointers to the left of the InsertLayer remains unchanged. Manipulating the values in the ActiveLayers and LayerPointer registers optimizes the Z-buffering process.

Another embodiment implements a method and apparatus for retaining objects having equal Z-values. In this embodiment, objects are assigned a tag as they are received. The tags are assigned according to how many previous received objects have the same Z-value. An overflow in the Z-buffer causes the objects in the Z-buffer to be composited. The composite object is given the Z-value and tag of the object in the last layer of the Z-buffer. The overflow causes the objects to be resubmitted. The object, causing the overflow, can then be stored in the Z-buffer.

Another embodiment of the present inventions implements a method and apparatus for retaining objects having equal Z-values where the objects are not necessarily resubmitted in the same order. When an overflow occurs, the objects stored in the Z-buffer having a Z-value equal to the object that caused the overflow, are discarded. The composite object is then made from the remaining objects in the Z-buffer. The objects are then resubmitted to the Z-sort circuit.

Although a great deal of detail has been included in the description and figures, the invention is defined by the scope of the claims. Only limitations found in those claims apply to the invention.

BRIEF DESCRIPTION OF THE DRAWINGS

The present invention is illustrated by way of example, and not limitation, in the figures. Like references indicate similar elements.

FIG. 3 illustrates how various combinations of received objects are managed.

FIG. 4 illustrates an example of how the ActiveLayers and LayerPointer registers operate for six consecutive incoming objects.

FIG. 7b illustrates how objects having equal Z-values may be discarded.

FIG. 9 illustrates how some types of received objects are managed where the objects are resubmitted in the same order.

FIG. 11 illustrates how some types of received objects are managed where the objects are resubmitted not necessarily in the same order.

DESCRIPTION OF THE PREFERRED EMBODIMENT

Overview

A high performance multiple layer Z-buffer in a computer graphics system is described. In the following description, for the purpose of explanation, numerous specific details such as registers, bit lengths, number of layers, etc., are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Computer System

Figure 1:
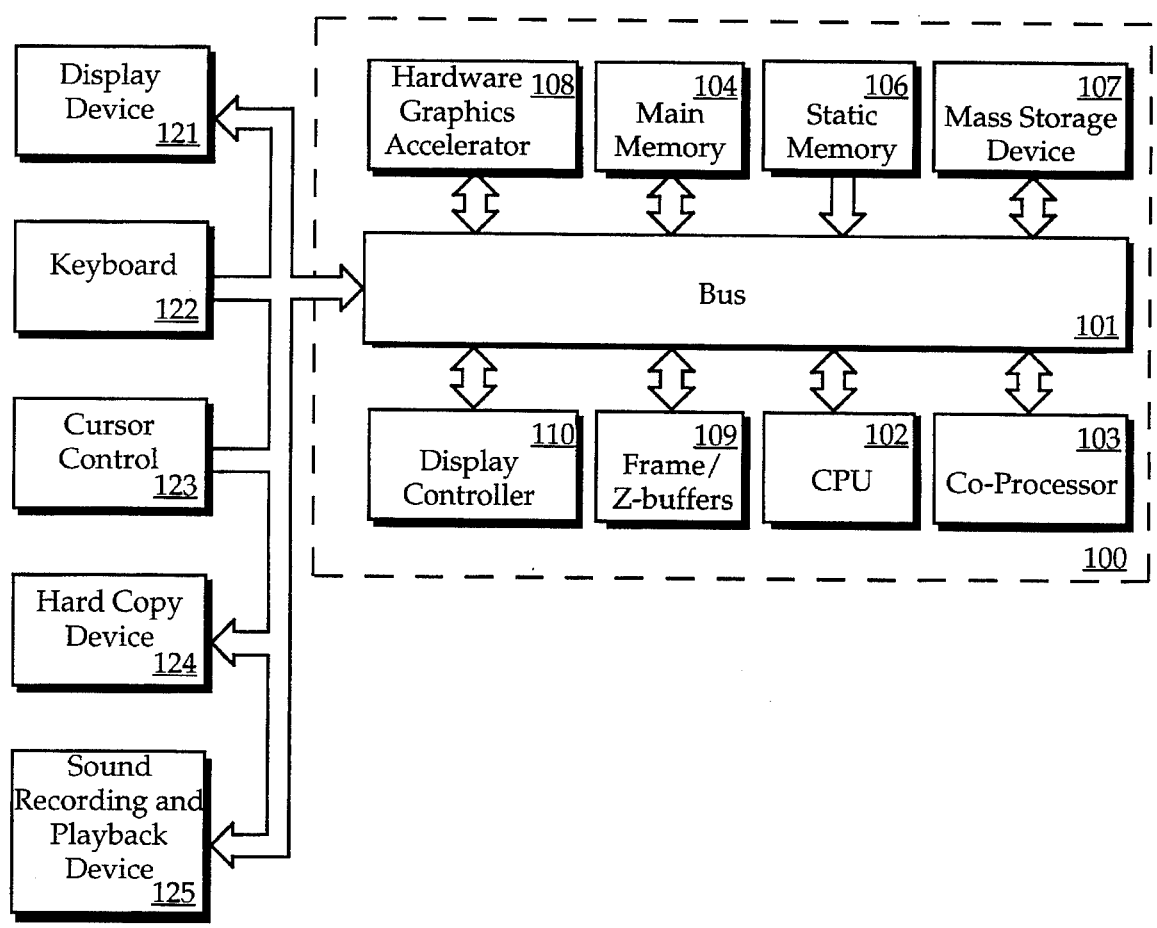
FIG. 1 illustrates a computer system upon which an embodiment of the present invention can be implemented.

Referring to FIG. 1, a computer system upon which an embodiment of the present invention can be implemented is shown as 100. Computer system 100 comprises a bus 101 for the internal transmission of digital data. A central processing unit 102 for processing digital data is coupled with bus 101 for processing information. Furthermore, a number of co-processors 103 can be coupled onto bus 101 for additional processing power and speed.

Computer system 100 further comprises a random access memory (RAM) 104 (referred to as main memory) which is also coupled to bus 101. Main memory 104 is used in storing information and instructions which are executed by processor 102. Main memory 104 also may be used for storing temporary variables or other intermediate information during execution of instructions by CPU 102. Computer system 100 also comprises a read only memory (ROM) or some other type of static storage device 106. ROM 106 is coupled to bus 101 and is used to store static information and instructions for processor 102. A data storage device 107 (e.g., a hard disk drive, floppy disk drive, etc.) drive can be coupled to bus 101 for storing information and instructions.

Also coupled to bus 101 is hardware graphics accelerator 108, frame/Z-buffers 109, and display controller 110. Hardware graphics accelerator 108 is designed to accelerate interactive 3D graphics software extensions. It comprises an ASIC, a static RAM cache, and texture mapping RAM. Accelerator 108 outputs a high bandwidth pixel stream to frame/Z-buffer 109. Simultaneously, the host CPU 102 generates the signal containing the primitives which are input to and rendered by accelerator 108. Display controller 110 interfaces computer system 100 to a display device 121.

One example of a display device 121 is a cathode ray tube (CRT) used for displaying information to a computer user. An alphanumeric input device 122, such as a keyboard, may also be coupled to bus 101, as well as a cursor control device 123. A cursor control device 123 is used for controlling cursor movement on display device 121. This input device typically has two degrees of freedom in two axes, a first axis (e.g., x) and a second axis (e.g., y) which allows the device to specify any position in a plane. In one embodiment of the present invention, a three-dimensional cursor having a third degree of freedom in a Z-axis is used. Some examples of a cursor control device 123 include a mouse, joystick, trackball, touch pad, a pen etc.

The present invention can be applied equally to conventional screen Z-buffering as well as scanline Z-buffering techniques. In screen Z-buffering, the state information necessary for rendering a pixel is stored for every pixel on the screen. Each object to be rendered is transformed and rasterized independently. Conventional screen Z-buffering techniques often involve very high bandwidths plus large quantities of fast memory and are often coupled with sophisticated caching and prefetching mechanisms. In comparison, scanline Z-buffering presorts the object database in screen space and renders each scanline individually. One scanline of pixel state information is kept.

Graphics System Using Scanline Z-Buffering

Figure 2:
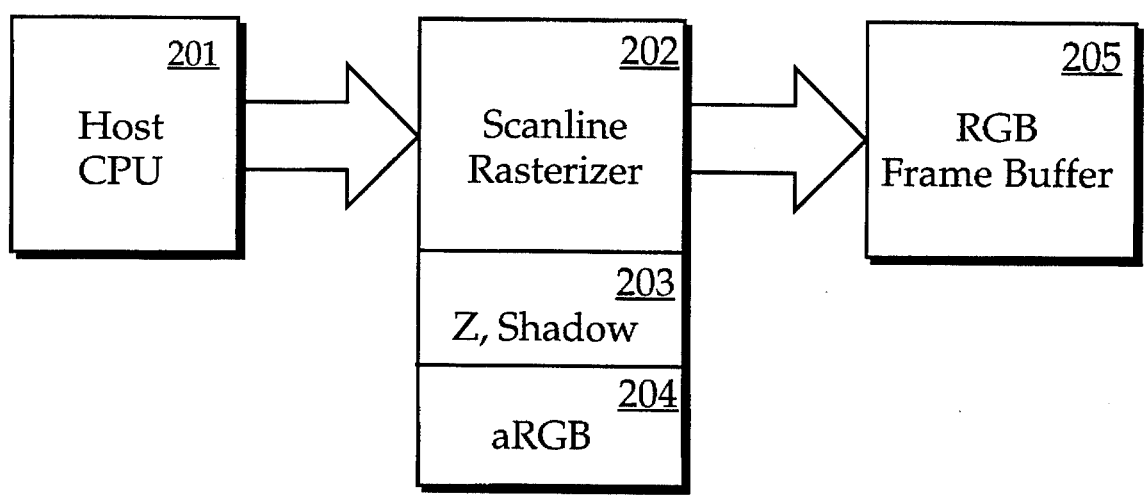
FIG. 2 is a block diagram showing a graphics system using scanline Z-buffering.

FIG. 2 is a block diagram showing a graphics system using scanline Z-buffering. The host CPU 201 is used for transformation, shading, and active list maintenance. Scanline rasterizer 202 performs shading and hidden surface removal via a Z-buffer 203, shadow volumes, and alpha blending 204. The rasterizer 202 intersects polygons transferred from the active polygon list with the scanline and generates a series of horizontal spans. The resulting spans are rasterized. Furthermore, hidden surface removal, shadow plane tests, and alpha blending are performed. Rendering begins when the CPU 201 traverses the 3D database and generates transformed, projected, clipped, and shaded polygons. The polygons are bucket sorted by the number of the first scanline on which they first become active. Once the main database traversal is complete, the host traverses the bucket sorted list in screen Y order, maintaining an active polygon list which is transferred into the rasterizer 202 for rendering into RGB frame buffer 205.

Z-values are typically represented as a floating point number with a 23-bit fractional normalized mantissa and an 8-bit exponent. There is also a one bit tag which is asserted if the object is frontfacing. If during the comparison the two Z-values are equal, it is necessary to determine if incoming object is frontfacing. There is a flag in the object data which is designed for this purpose. If the incoming object is frontfacing it is considered to be in front of the object which is in the buffer. In another implementation the inverse of the front-facing tag is appended as the first bit position of the Z-value, effectively increasing the Z-value resolution. When the Z-values of two objects are equal, except for the front facing tag, the object which has the tag asserted will be less than the object which does not have the tag asserted. In the present embodiment, the Z-buffer is comprised of multiple layers and multiple pixels for handling opaque as well as non-opaque objects. Although any number of layers and pixels can be implemented with the present invention, eight layers and eight pixels are used in an embodiment. In another embodiment, only four layers are used.

The Z-value of incoming data for a particular pixel is compared with each layer in the buffer until it is determined where or whether it should be placed in the buffer. There are two registers, an ActiveLayers register and a LayerPointer register associated with each pixel for optimizing the sorting process. The ActiveLayers register indicates how many of the layers are occupied with potentially visible object data. Because non-opaque objects are supported, it is not known whether an object is visible until after the compositing operation is completed. The LayerPointer register indicates in which memory location the data for each layer is to be stored.

The operation of these two registers are now described in detail. The ActiveLayers register is first initialized to zero. When the first object is received it is written into the layer of the Z-buffer as indicated by the ActiveLayers register. Since the ActiveLayers register had been initialized to zero, the first object is thereby written to Layer 0, the ActiveLayers register is incremented by one. When a successive incoming object is received its value is compared with the Z-value of the object in layer 0. The opacity of the incoming object only affects the ActiveLayers register and not the LayerPointer register nor the Z-buffer. Whether the incoming object is written is determined by the opacity of objects in the buffer and overflow. Its write location is determined by the relative Z-values.

Examples of Managing Received Objects

FIG. 3 shows various different combinations of how incoming opaque and non-opaque objects are handled.

Examples of each possible combination are given illustrating how the objects are assigned to the different layers along with the corresponding changes made to the ActiveLayers register. In example 1, the ActiveLayers register is initialized to a value of zero after completion of rendering. Whenever an incoming object 301 is received, it is written into the layer designated by the ActiveLayers register. In example 1, the first object is opaque and is written into layer 0. The ActiveLayer register is then incremented by one (i.e., incremented from 0 to 1). In example 2, a second incoming object 302 is received. Object 302 is opaque and has a smaller Z-value than object 301 (i.e., object 302 is closer to the viewport than object 301). The incoming data corresponding to object 302 is written to layer 0. The contents of the ActiveLayers register remains unchanged (i.e., it remains set at 1). Note that the data corresponding to object 301 has been effectively overwritten. It still exists in the Z-buffer RAM; only the LayerPointer register changes. Hence, if the incoming object falls behind a pre-existing opaque object, the incoming object is "hidden" behind the opaque object and can thereby be discarded.

Example 3 illustrates the events occurring if the second incoming object 302 has a greater Z-value than object 301 which resides in layer 0. Since object 302 is "hidden" behind opaque object 301, its incoming value can be safely discarded. Everything else remains the same. In example 4, the incoming object 303 is non-opaque and has a smaller Z-value. Hence, the data corresponding to object 301 is moved so as to correspond to layer 1, and the incoming data is written to layer 0. The ActiveLayers register is incremented to 2. In example 5, the incoming non-opaque object has a larger Z-value. Consequently, its incoming data is discarded.

Referring to examples 6–9, the pre-existing object 304 is non-opaque. In example 6, an incoming object 305 is opaque and has a smaller Z-value. Hence, the incoming data is written to layer 0 and the data associated with object 304 is discarded. If the incoming opaque object 305 has a larger Z-value, its data corresponds to layer 1; the ActiveLayers register is incremented to 2; and the data corresponding to object 304 remains stored in layer 1, depicted in example 7.

Example 8 illustrates the events which occur when the incoming object is non-opaque and has a smaller Z-value. Under such circumstances, the data corresponding to pre-existing object 304 is moved to layer 1; the incoming data is written to layer 0, and the ActiveLayers register is incremented by one to 2. In example 9, the incoming non-opaque object 306 has a larger Z-value. Consequently, the incoming data is changed to correspond to layer 1 and the ActiveLayers register is incremented to 2. Table 1 below lists the eight different possible scenarios associated with an incoming object.

By implementing an ActiveLayers register, only those layers which contain potentially visible objects are compared during the sort operation. Note that without using an ActiveLayers register or its equivalent, incoming data would be required to be checked against all eight layers. Reading and writing the object data is costly in terms of speed since it requires accessing the Z-buffer DRAM. Note that typical prior art Z-buffers only have one layer, two at the most, so only one or two reads are required to complete the sort operation. Multiple layers complicate the Z-sort operation, but are necessary to defer the compositing operation and to eliminate the need for ordering the non-opaque data.

The ActiveLayers register also simplifies the removal of obstructed objects from the Z-buffer. If any object falls behind an opaque object, it must be removed from the buffer which requires that the RAM be written. Instead of writing the RAM, the value in the ActiveLayers register is adjusted to reflect the new condition.

Furthermore, an ActiveLayers register saves time by eliminating the need to initialize each of the eight layers to the maximum Z-value (i.e., infinity). Rather, after each frame has been completely rendered, the ActiveLayers register is reset to zero. In typical prior art Z-buffers, all of the Z-values would have to be written to the maximum value and to a transparent object data.

In addition to the ActiveLayers register, a second, LayerPointer register, is implemented to minimize Z-buffer DRAM accesses. The LayerPointer register contains a number of pointers equal to the number of layers being used. In one embodiment, eight 3-bit pointers are used. A pointer specifies a unique address of an object's data corresponding to each of the eight layers. The rust pointer corresponds to layer 0. The second pointer corresponds to layer 1. Each successive pointer corresponds to each successive layer, up to layer 7.

By utilizing these pointers in the LayerPointer register, the movement of an object from one layer to another can essentially be simulated without actually reading from and writing to the Z-buffer. The present invention does not require reading the data of the pre-existing object, writing it into another layer, and then writing the incoming object's data into the lust layer. Instead, one embodiment of the present invention accomplishes the same result by manipulating pointer values. In an embodiment, the lowest pointer (i.e., the one corresponding to layer 7) is used to specify the address of an incoming object being written into the Z-buffer. In other words, the incoming data is written to the address specified by the pointer corresponding to layer 7.

Register Operation Examples

FIG. 4 shows an example of how the ActiveLayers and LayerPointer registers of one embodiment of the present

TABLE 1

| Pre-existing Object₁ in Layer 0 | Incoming Object₂ | Z-value of Incoming Object | Layer 0 | Layer 1 | ActiveLayers Register |
| --- | --- | --- | --- | --- | --- |
| Opaque | Opaque | Smaller | Object₂ | — | 1 |
| Opaque | Opaque | Larger | Object₁ | — | 1 |
| Opaque | Non-opaque | Smaller | Object₂ | Object₁ | 2 |
| Opaque | Non-opaque | Larger | Object₁ | — | 1 |
| Non-opaque | Opaque | Smaller | Object₂ | — | 1 |
| Non-opaque | Opaque | Larger | Object₁ | Object₂ | 2 |
| Non-opaque | Non-opaque | Smaller | Object₂ | Object₁ | 2 |
| Non-opaque | Non-opaque | Larger | Object₁ | Object₂ | 2 | invention operate for six consecutive incoming objects. Once the rendering of a frame has been completed, the ActiveLayers register is initialized to 0 and the LayerPointer register is set so that each pointer specifies a unique address. Note that the pointers need not be specified in any sequential order, but each pointer must specify a unique address. In the example, the eight 3-bit pointers are initialized to the following addresses: 7, 6, 5, 4, 3, 1, and 0 corresponding to layers 0–7, respectively.

The first incoming object 401 is opaque and has a Z-value of 15. The pointer corresponding to layer 7 specifies an address of 0. Since it is the first object, the data should be inserted in layer 0. The ActiveLayers register is incremented. A barrel shift-right by one place is performed on layers 0–7 of the LayerPointer register. Hence, the Active-Layers register becomes 1, and the contents of the Layer-Pointer register becomes 0, 7, 6, 5, 4, 3, 2, and 1. Note that the incoming data stored in address 0 now appropriately resides in layer 0.

A second incoming object 402 is opaque and has a Z-value of 10. Its data is written to the address specified by the pointer of layer 7. In this case, the data is written to address 1. The Z-values of object 402 is compared with that of object 401. Since object 402 is opaque and has a smaller Z-value than object 401, object 401 is hidden behind object 402. Consequently, the incoming data should be inserted in layer 0. The ActiveLayers register remains unchanged. A barrel shift-right is performed on layers 0–7 of the Layer-Pointer register, such that it becomes 1, 0, 7, 6, 5, 4, 3, and 2. Note that the pointer of layer 0 correctly specifies the address containing the data of object 402. Note also that the data of object 401 still resides in address 0, but since the ActiveLayers register only specifies one layer, this data is rendered meaningless.

The third incoming object 403 is non-opaque and has a Z-value of 8. The data of object 403 is written to address 2, as specified by the pointer of layer 7. Object 403 is in front of object 402 because its Z-value of 8 is less than the Z-value of 10 for object 402. Consequently, the incoming data should be inserted in layer 0. Since object 403 is non-opaque, the data corresponding to object 402 must still be maintained. Thus, ActiveLayers register is incremented. A barrel shift-right operation is performed for layers 0–7 of the PointerLayer register. The LayerPointer register now reads 2, 1, 0, 7, 6, 5, 4, and 3. The result is that the ActiveLayers register specifies two layers (i.e., layers 0 and 1). The pointer in layer 0 correctly specifies address 2, which contains the data for object 403, and the pointer in layer 1 specifies an address of 1, which contains the data for object 402.

A fourth incoming object 404 is non-opaque and has a Z-value of 9. The pointer of layer 7 specifies an address of 3. The incoming data is written to that address. Since the Z-value of object 403<Z-value of object 404<Z-value of object 402, the data of object 404 should be inserted in layer 1, in-between objects 403 and 402. The data of object 402 should be altered to correspond to layer 2 while that of object 403 should remain layer 0. This is effectuated by performing a barrel shift-right operation only for levels 1–7. The resulting contents of the LayerPointer register is 2, 3, 1, 0, 7, 6, 5, and 4. The ActiveLayers register is incremented. Thus, the pointers of the first three layers specify addresses 2, 3, and 1 which respectively correspond to that of objects 403, 404, and 402.

The fifth incoming object 405 is non-opaque and has a Z-value of 11. Since it falls behind the opaque object 402, the incoming data is discarded. No changes are made to either the ActiveLayers or LayerPointer register.

The sixth incoming object 406 is opaque and has a Z-value of 5. Object 406 falls in front of and hides all the pre-existing objects 402–404. The incoming data is written to address 4 and is inserted to layer 0. A barrel shift-right is performed for layers 0-7 of the LayerPointer register, so that it reads 4, 2, 3, 1, 0, 7, 6, and 5. Furthermore, the Active-Layers register is reset to 1. It should be pointed out that modifying the ActiveLayers and LayerPointer registers is much quicker than accessing the DRAM to write the maximum Z-value and the transparent alpha value as the registers occupy far fewer bits.

In one embodiment, the incoming object is checked to determine whether it falls behind the backmost object of the Z-buffer. If it falls behind the backmost object and that object is opaque, the incoming data is discarded. If the backmost object is not opaque, the incoming data is placed behind it, and the ActiveLayers and LayerPointer registers are modified accordingly. In this embodiment, only one comparison is needed to determine whether the incoming data should be discarded.

Apparatus for Maintaining the LayerPointer Register

Figure 5:
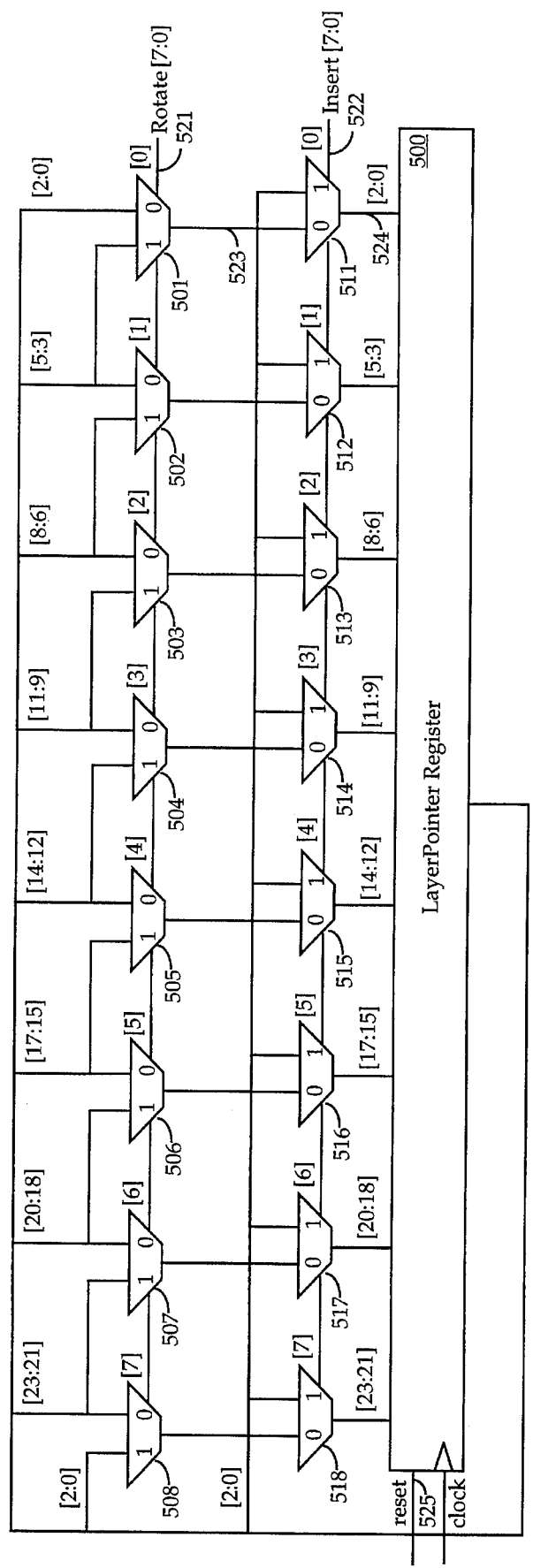
FIG. 5 illustrates one apparatus for maintaining the LayerPointer register.

FIG. 5 is a circuit diagram illustrating one apparatus for maintaining the LayerPointer register 500. Once the layer wherein an incoming object's data is to be inserted (i.e., the InsertLayer) is determined, the Rotate and Insert signals are generated according to Table 2 below.

TABLE 2

| Insert Layer | Rotate | Insert |
|---|---|---|
| 0 | 0 × 7 F | 0 × 80 |
| 1 | 0 × 3 F | 0 × 40 |
| 2 | 0 × 1 F | 0 × 20 |
| 3 | 0 × 0 F | 0 × 10 |
| 4 | 0 × 07 | 0 × 08 |
| 5 | 0 × 03 | 0 × 04 |
| 6 | 0 × 01 | 0 × 02 |
| 7 | 0 × 00 | 0 × 01 |

The upper multiplexers 501–508 are used to rotate the pointers, especially for those situations wherein the incoming object is placed in front of other pre-existing objects in the Z-buffer. The rotate operation is performed by a barrel shift-right. The barrel shift-right is executed according to the 8-bit digital Rotate signal on line 521. Each of the eight bits controls each of the eight multiplexers 501–508. In other words, control bit 0 of the Rotate signal controls multiplexer 501; bit 1 controls multiplexer 502; etc. The control bit selects which of the two inputs to a multiplexer is to be output. Note that LayerPointer register 500 has eight layers and three bits per layer, for a total of 24 bits. Each multiplexer has two 3-bit inputs supplied by the LayerPointer register. If the control bit is a 0, the three bits corresponding to a particular pointer is selected for output on line 523. Conversely, if the control bit is a 1, the three successive next significant bits are selected for output on line 524. For example, if control bit 0 is a 0, bits 0–2 of the LayerPointer register 500, is selected for output by multiplexer 501. If control bit 0 happens to be a 1, bits 3–5 are selected for output by multiplexer 501.

The lower multiplexers 511–518 are used to move the pointer associated with layer 7 prior to receipt of incoming data, to the layer which the incoming object data is to be inserted. The insert operation is performed according to the 8-bit digital Insert signal on line 522. Each of the eight control bits of the Insert signal controls one of the eight multiplexers 511–518. A control bit selects for output one of the two input signals to a multiplexer. One input signal is a 3-bit output from one of the upper multiplexers. The other input signal is the three least significant bits of the Layer-Pointer register 500 (i.e., bits 0–2 which correspond to the pointer of layer 7). For example, if control bit 0 of the Insert signal is a 0, multiplexer 511 selects the 3-bit output from multiplexer 501 for output on line 524. If control bit 0 were a 1, multiplexer 511 selects bits 0–2 of the LayerPointer register 500 for output on line 524.

The operation of this LayerPointer circuit is now described in reference to the incoming objects depicted in FIG. 4 and described above. A reset signal on line 525 initializes the LayerPointer register 500 to a value of 7, 6, 5, 4, 3, 2, 1, and 0=111110101100011010001000. When data corresponding to object 401 is received, its InsertLayer is determined to be 0. Consulting Table 2, an InsertLayer of 0 translates into a Rotate signal of 0×7F=01111111, and the Insert signal is 0×80= 10000000. According to the Rotate signal, multiplexer 501 selects bits 3–5 for output; multiplexer 502 selects bits 6–8; multiplexer 503 selects bits 9–11; multiplexer 504 selects bits 12–14; multiplexer 505 selects bits 15–17; multiplexer 506 selects bits 18–20; multiplexer 507 selects bits 21–23; and multiplexer 508 selects bits 21–23. And according to the Insert signal, multiplexers 511–517 select the outputs of multiplexers 501–507 respectively; multiplexer 518 selects bits 0–2 for output. The result is that the pointers for layers 0–6 are shifted to the right. The pointer corresponding to layer 7 is inserted into layer 0. The resulting contents of the Layer-Pointer register is 000111110101100011010001=0, 7, 6, 5, 4, 3, 2, 1.

General Z-Sort Algorithm

Figure 6:
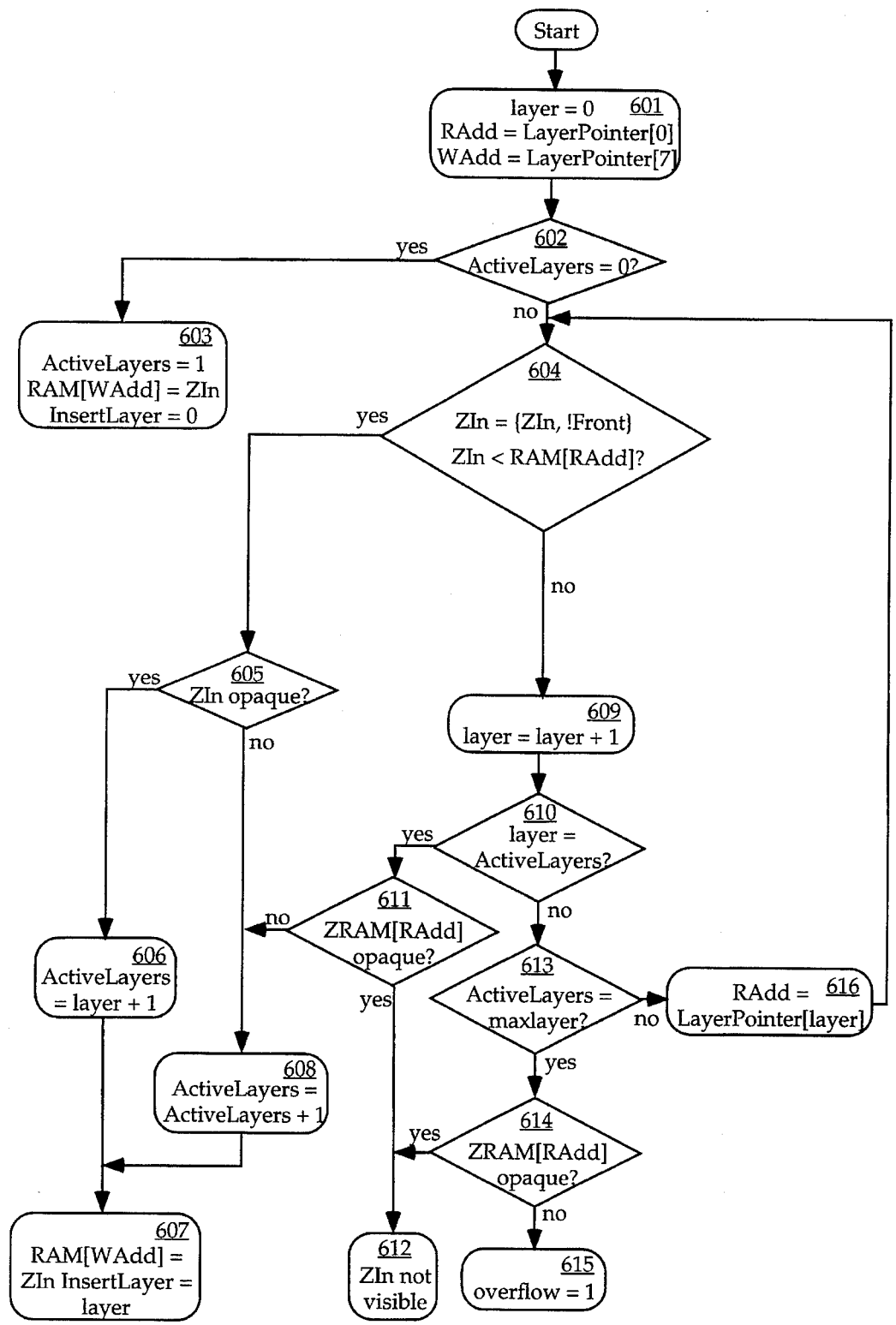
FIG. 6 is a flowchart illustrating one method for performing a Z-sort operation.

FIG. 6 is a flowchart showing the operations performed during the Z-sort, wherein the contents for the ActiveLayers and LayerPointer registers are calculated. In the first operation, step 601, the LayerCounter is initialized to 0; the RAM read address (RAdd) is initialized to LayerPointer [0]; and the RAM write address (WAdd) is initialized to Layer-Pointer [7]. A determination is then made as to whether the ActiveLayers register is 0, step 602. If so, the ActiveLayers register is incremented to 1; the InsertLayer is set to 0; and ZIn is written into the RAM at the write address. If the ActiveLayers register is not 0, the Z-values for each of the objects are compared, step 604. If the Z-value of the incoming object is closer than the Z-value presently associated with layer 0, step 605 is performed. Remember that the front-facing tag is included in ZIn (and the RAM data). Otherwise, step 609 is executed.

In step 605, a determination is made as to whether the incoming object is opaque. If the incoming object is opaque, the ActiveLayers register is set to the LayerCounter plus 1, step 606. The InsertLayer is set to the LayerCounter, and ZIn is written into the RAM at the write address, step 607. If it is determined that the incoming object is not opaque, the ActiveLayers register is incremented, step 608. Step 607 wherein the InsertLayer is set to the LayerCounter and the ZIn is written.

In step 609, the LayerCounter is incremented. A determination is made as to whether the LayerCounter is equal to the ActiveLayers, step 610. If they are equal, this signifies that there are no more Z-values in the RAM for comparison. In that case, a determination is made as to whether the object in the last layer is opaque, step 611. If the object in the last layer is not opaque, step 608 is executed. Otherwise, ZIn is not visible, and it is discarded, step 612.

If the LayerCounter is not equal to the value in the ActiveLayers register, it becomes necessary to check the Z-buffer to determine whether it is full, step 613. If the ActiveLayers register value is equal to the maximum layer (e.g., 8), this indicates that the Z-buffer is full. A determination is then made as to whether the object in layer 8 is opaque, step 614. If so, then ZIn is discarded, step 612. Otherwise, an overflow condition is asserted, step 615. If, however, the value in the ActiveLayers register is not equal to the maximum layer, ZIn is compared with the other Z-values in the RAM. The read address for the next layer is determined by reading the LayerPointer register. ZIn is compared with the Z-value read from the RAM using the new read address, step 616. Step 604 is then repeated.

Infinite Curtain

In one embodiment of the present invention, the Z-buffer has only four layers. As the number of layers of a Z-buffer decrease, the likelihood that all the non-opaque objects can be sorted before a compositing operation is needed decreases. For example, if a Z-buffer includes eight layers, then eight non-opaque objects can be sorted in the Z-buffer before an overflow occurs. The overflow occurs when the Z-buffer cannot hold all the needed objects. Where a Z-buffer includes only four layers, an overflow is likely to occur much more often. Therefore some technique for managing an overflow is needed.

In one embodiment of the present invention, objects in the Z-buffer are composited after an overflow occurs. By compositing all the non-opaque objects stored in the Z-buffer into a single object, the number of layers needed to store a representation of those objects is reduced. This frees up layers for other objects. In one embodiment, this composite object is called an infinite curtain.

In the following description, a number of references have been made to in front, last layer, tag=0.0, etc. However, one of ordinary skill in the art would understand, given this description, that these references are merely illustrative of one embodiment of the present invention. For example, another embodiment sorts from back to front and composites are inserted in the last layer. In another embodiment, tags are represented as bits that are stored directly with the Z-value.

Figure 7A:
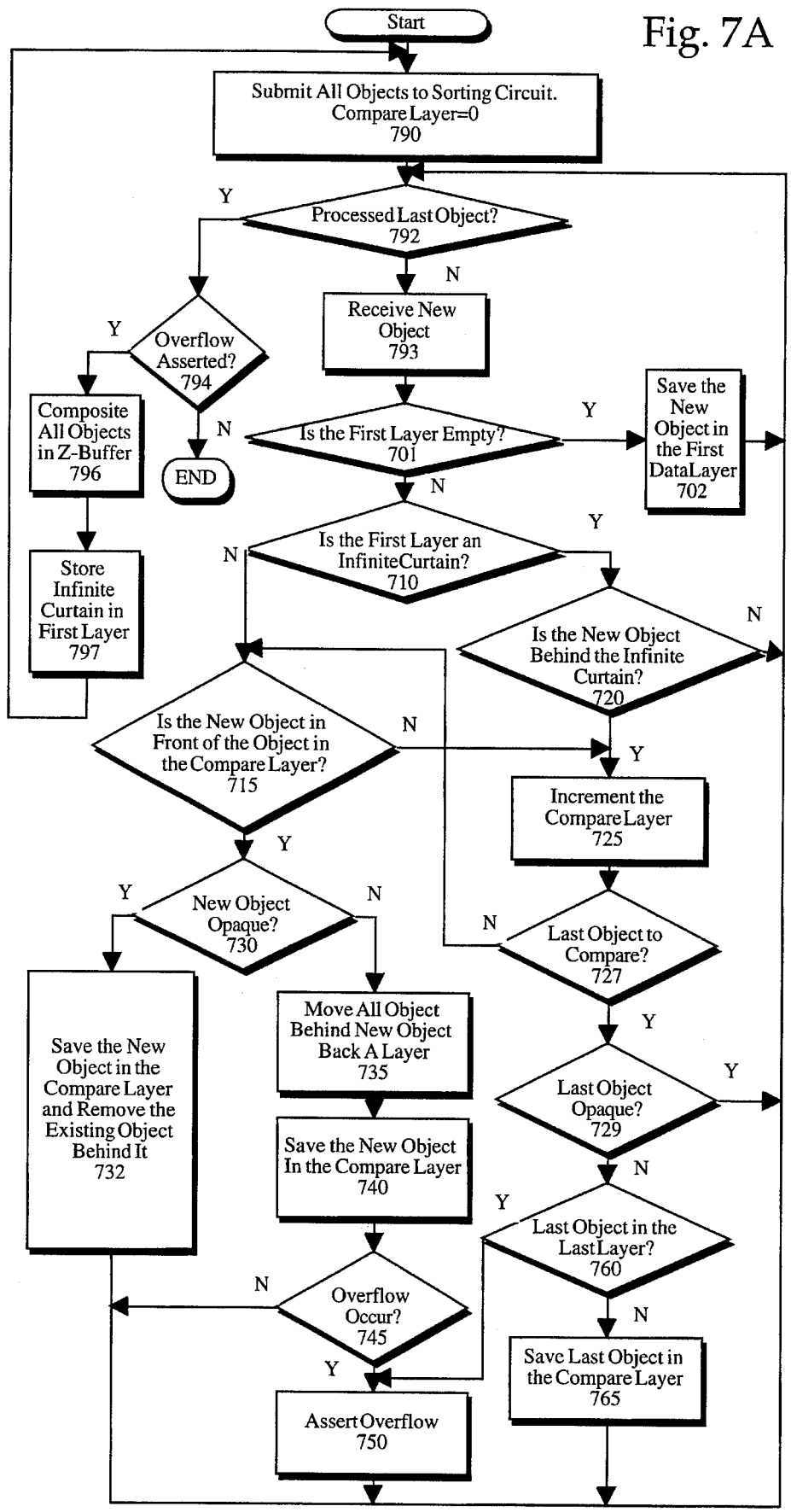
FIG. 7a is a flowchart showing a Z-sort method employing an infinite curtain.

FIG. 7 is a flowchart illustrating a Z-sort using the infinite curtain. In the following description a compare layer relates to one of the active layers.

At step 790, all the active objects for the current pixel are submitted. The compare layer is set to 0. At step 792, a test is performed to determine whether all the active objects, for the present pixel, have been submitted to the sorting circuit. Assuming that additional objects need to be processed, step 793 is executed. At step 793, new object is received. Next, at step 701, a test is made to determine whether the first layer in the Z-buffer is empty. If the first layer is empty, then step 702 is executed, wherein the new object data is saved in the first layer. Once the data has been saved in the first layer, step 792 is executed again.

However, if there is data, in the first layer, then step 710, from step 701, is executed. At step 710, a test is made to determine whether the first layer is an infinite curtain layer. If not, then step 715 is executed. In step 715, a test determines whether the new object is in front of the object in the compare layer.

If the new object is in front of the compare layer, then step 730 is executed. Test is made, at 730, to determine the new object is opaque. If the new object is opaque, at step 732, the new object is saved in the compare layer and all the objects behind this new object are removed. Next, step 792 is executed again to determine whether more objects need to be sorted.

However, at step 730 if the new object is not opaque, then all the objects behind the new object are moved back a layer, at step 735. At step 740, the new object is received in the compare layer. At step 745, a determination is made whether an overflow has occurred. An overflow occurs when more objects can be seen than the Z-buffer can hold. The Z-buffer cannot hold the extra object (i.e. the Z-buffer is full), yet that object must be included in the final pixel data. See the discussion of FIG. 9 for an example. If no overflow has occurred, then step 792 is executed. However, if an overflow has occurred, then an overflow flag is asserted, at step 750.

Returning to step 710, if the first layer is an infinite curtain, then steps 720–765 are executed. At step 720, the sorting circuit determines whether the new object is behind the infinite curtain. If the new object is not behind the infinite curtain, we know that the object has been composited into the infinite curtain and can be discarded. Thus, if the object is in front of the infinite curtain, step 792 is executed. However, if the new object is behind the infinite curtain, then the compare layer is incremented, at step 725. If this is the last object to compare in the Z-buffer, at step 727, then step 729 is executed. At step 729, it is determined whether the last object is opaque. If the last object is opaque, then step 792 is executed. Otherwise, step 760 is executed. At step 760, it is determined whether the compare layer points at the last object to compare. If no more objects can be compared, because all of the layers are occupied, then step 750 is executed, where the overflow flag is asserted. Otherwise, at step 765, the new object is saved in the Z-buffer in the first empty layer behind the occupied layers. Then step 792 is executed again.

Returning to step 727, if the compare layer is not pointing at the last object to compare, then step 715 is executed. At step 715, as above, the new object is tested to determine whether it is in front of the object in the present compare layer. If the new object is not in front of the object to compare layer, then the compare layer is incremented, at step 725. By repeating steps 725, 727, and 715, the new object is tested against each of the objects in the Z-buffer, until the new object can be inserted, steps 730–750, or the new object is inserted behind all of the objects in the Z-buffer, (in the first empty layer behind the occupied layers) steps 729–765.

Returning to step 792, if all of the active objects for the present pixel have been submitted to the sorting circuit, then step 794 is executed. At step 794, the overflow flag is tested to determine if an overflow had occurred in the last sort. If an overflow has not occurred, then all the objects have been sorted for the present pixel. That is the sorting of objects affecting a given pixel will be complete.

However, if an overflow has occurred in the last sort, then step 796 requires that all the objects in the Z-buffer be composited. This composite is called the infinite curtain. The infinite curtain is stored in the first layer of the Z-buffer, at step 797. Also the infinite curtain is assigned Z-value equal to the object in the last layer of the Z-buffer. Next, step 790 is executed to cause all the objects be resubmitted to the sorting circuit and the compare layer is set to 0.

One benefit of the present embodiment is that an infinite curtain can be composited with other objects to form another infinite curtain. For example, a first overflow causes a first composite. A second overflow, will cause the objects in the Z-buffer to be composited. However, the objects in the Z-buffer include the first composite. Thus, the second composite object includes the objects composited to form the first object.

Thus, the infinite curtain can be used to sort a number of non-opaque objects in the Z-buffer. However, one problem occurs where a number of non-opaque objects, having equal Z-values, are attempted to be sorted. Given the above implementation of the infinite curtain, objects having equal Z-values may be discarded and therefore not shown on the display.

FIG. 7b illustrates how objects having equal Z-values may be discarded. In the first column, objects received are represented. In the next four columns, the status of each corresponding layer in the Z-buffer is represented. This is the status of each layer after the object in the first column has been processed by the Z-buffer.

At 7000, the Z-buffer is initialized. At 7010, an object with a Z-value of 1 is received. This object is inserted in layer 0 of the Z-buffer. At 7015, an object with a Z-value of 0 is received. This object is inserted in layer 0, the previous layer 0 object is moved to layer 1. At 7020, an object with a Z-value of 2 is received. This object is placed in layer 2. At 7025, another object having a Z-value of 2 is received. This object is placed in layer 3. At 7030, another object having a Z-value of 3 is received. This object causes an overflow and cannot be inserted in the Z-buffer. At 7035, an infinite curtain is generated from the overflow at 7030. The Z-value of the infinite curtain object is equal to 2. At 7040, all the objects received in steps 7010 through 7025 are discarded because their Z-values are less than, or equal to, 2. At 7045, the object received at step 7030 is rereceived. This object, having a Z-value of 2, is also discarded. This results in the composite pixel not being representative of all the received objects. That is, the 7030 object is never composited because it has a Z-value equal to the infinite curtain's Z-value.

Managing Objects Having Equal Z-Values

Two possible solutions have been discovered to solve the problem of losing objects having equal Z-values. The first solution employs a tag and requires that the objects be resubmitted in the same order. The tag size limits the number of objects having equal Z-values. The second solution does not employ a tag and does not require that the objects be resubmitted in the same order. However, the number of objects having equal Z-values that can be sorted is limited to the number of layers in the Z-buffer minus one.

In one embodiment, the objects, being submitted in step 790, are submitted in the same order each time an overflow occurs. For this situation, it has been discovered that adding a tag to the received objects allow for the retention of objects having equal Z-values.

Figure 8:
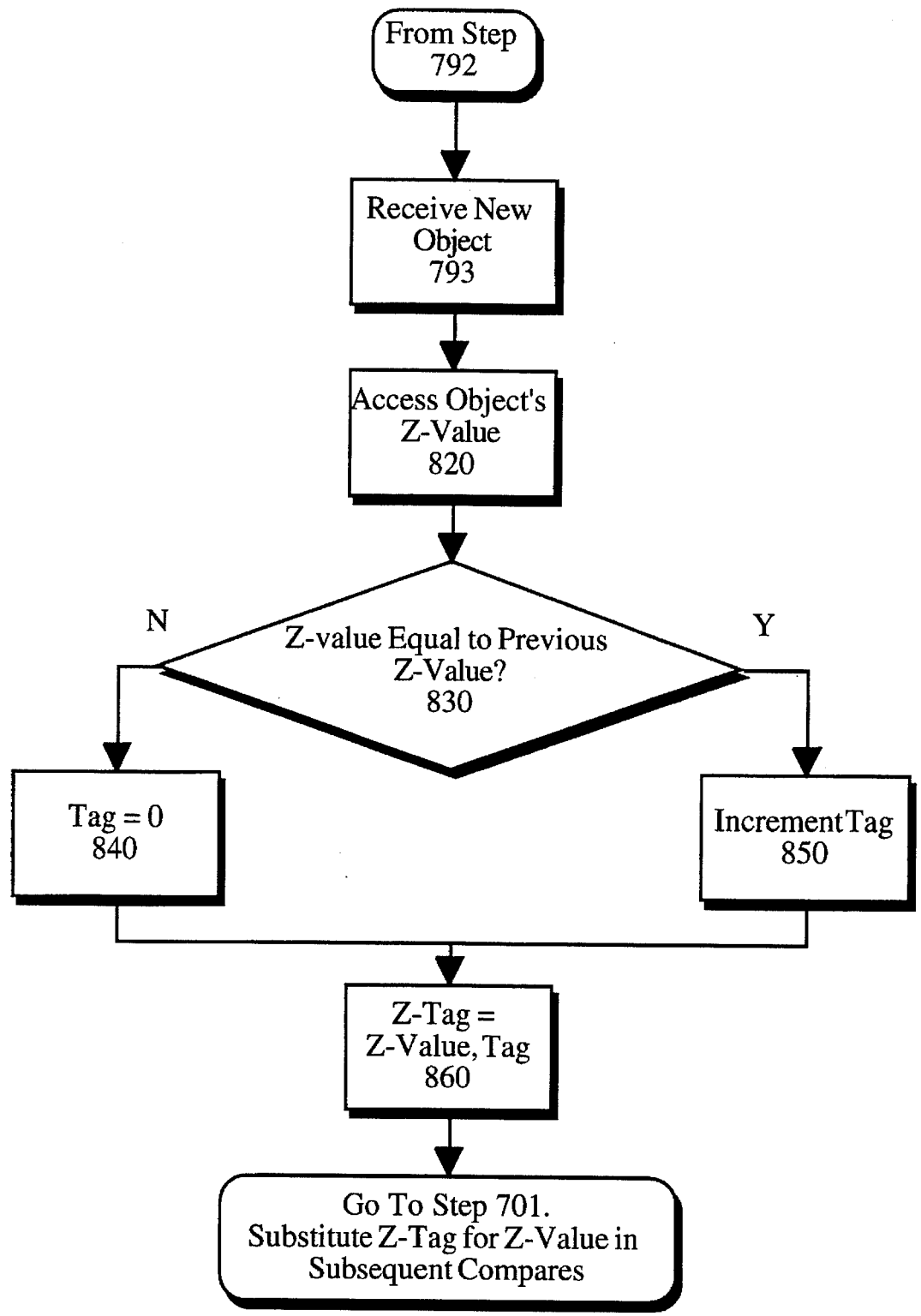
FIG. 8 is a flowchart of a method of managing objects having equal Z-values.

FIG. 8 illustrates one embodiment of the present invention. First, the object is received as before, step 793. Then access the object's Z-value, 820. Next, at 830, determine whether an object having an equal Z-value has been received previously. If an object has been received that has an equal Z-value, access its tag and increment the tag value to generate a new tag for the new object, 850. In one embodiment of the present invention, the tag represents a fraction of an object's Z-value. Thus, the tag indicates the order of the object as it has been received. If an object has the same Z-value as another object, then the newer object receives a higher tag number. Otherwise, the object receives a tag of 0,840. At step 860, a Z-tag is created for the new object. This Z-tag substitutes for the Z-value in the remaining steps of the sorting algorithm.

As before, once all the objects have been received, the overflow flag is tested. If an overflow occurred, the infinite curtain is generated. The infinite curtain is stored in the front layer and then assigned the Z-tag of the object in the last layer of the Z-buffer.

The example shown in FIG. 9 illustrates the benefits of this solution. FIG. 9 illustrates the status of a Z-buffer having four layers. At 900, the Z-buffer is initialized and contains no objects. That is layer 0, layer 1, layer 2, and layer 3, are all empty. At 910, an object having a Z-value equal to 1 is received. As the Z-buffer contains no other objects having a Z-value equal to 1, a tag equal to point 0 is generated. This object is then stored in the layer 0 and assigned a Z-tag equal to 1.0. At 915, an object having a Z-value equal to 0 is received. As before, because there are no other objects having a Z-value equal to 0, this object is assigned a tag of 0.0. The object is then stored in layer 0. The previous object, stored in layer 0, is moved to layer 1.

At 920, an object having a Z-value equal to 2 is assigned a tag equal to 0.0 this object is then stored in layer 2 of the Z-buffer. At 925, a second object having a Z-value equal to 2 is received. Because a previous object has been received having a Z-value of 2, this new object is assigned a tag of 0.1. The new object of 2.1 is stored in layer 3.

At 930, a third object having, a Z-value equal to 2, is received. As this object cannot fit in the Z-buffer, an overflow occurs. The third, Z-value equal to 2, object is assigned a tag of 0.2. This object cannot be inserted in the Z-buffer because the Z-buffer is full. Assume for the purposes of this example, that only the five objects present are to be sorted. At 935, a composite object, or infinite curtain, is generated in response to detecting the overflow. The composite is assigned a Z-tag associated with the object in the last layer, layer 3, of the Z-buffer. In this case, the infinite curtain is assigned a Z-tag equal to 2.1 and is stored in layer 0. At 940, all the objects have been resubmitted for sorting. As objects 910, 915, 920, and 925 are received, they will be discarded because their Z-tags will be less than the Z-tag equal to 2.1. That is, each of these objects are in front of, or coincident with, the infinite curtain. At 945, the object previously causing the overflow at 930 is received again. It is assigned Z-tag equal to 2.2. This object can now be stored in layer 1 of Z-buffer. Thus, this embodiment solves the problem of retaining objects having equal Z-values for a Z-buffer having two or more layers.

Note that other objects could follow the 930 object, prior to the compositing 935. If, for example, an object having a value of 0 were received, it would be assigned a Z-tag of 0.1. This object would be inserted in layer 1. Objects Z-tag=1.0, and Z-tag=2.0 would be shifted down a level. Z-tag 2.1 would fall off the end of the Z-buffer. Thus, the composite would have a Z-tag of 2.0, and would be a composite of Z-tag=0.0, Z-tag=0.1, Z-tag=1.0, and Z-tag=2.0.

The above description demonstrates the use of tag that incremented when a previous object, having the same Z-value, has been received. However, the present invention is not limited to such tag generation. For example, another embodiment of the present invention increments a tag value every time an object is received. For example, the first object will be given a first tag. The next object is given an incremented tag. The next object is given the next higher tag. The tags are incremented irrespective of their Z-value. Each tag is then stored with the object. The objects are stored in the Z-buffer first according to Z-value, and then according to their tag value. In this embodiment, no information need be retained as to whether objects having a given Z-value have been received.

Managing Equal Z'S, Resubmitted in any Order

In another embodiment of the present invention, objects being resubmitted for sorting are not necessarily resubmitted in the same order as they were submitted when the overflow occurred. A solution has been discovered that allows objects having equal Z-values to be sorted and does not require any additional tags.

Figure 10:
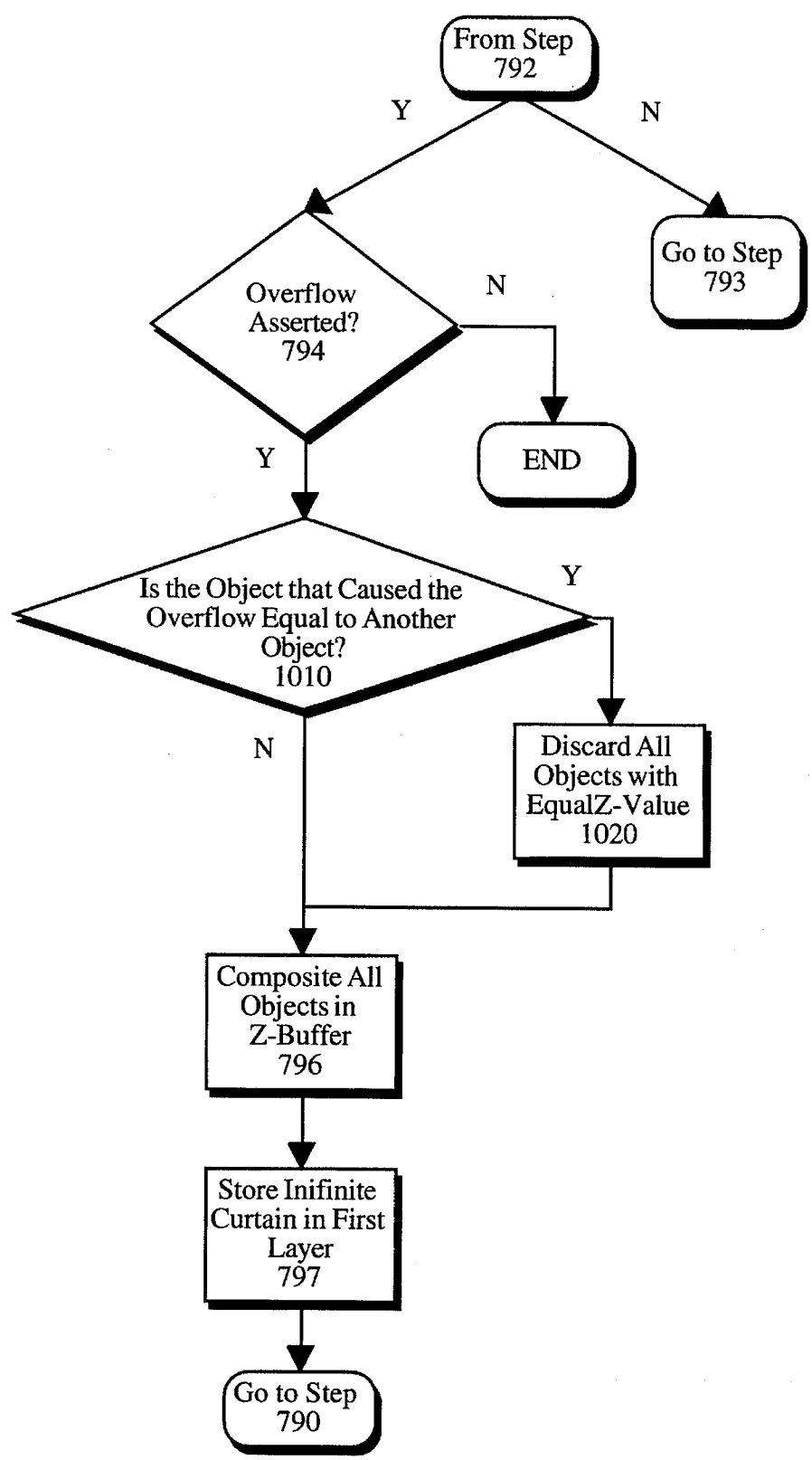
FIG. 10 is a flowchart showing a second method for managing objects having equal Z-values.

FIG. 10 illustrates one embodiment of the present invention. At step 792, if no additional objects are to be received for the present pixel, the overflow flag is tested, 794. As previously, if no overflow was asserted, then the objects for the present pixel have been sorted. If the overflow has been set, then step 1010 is executed. At step 1010, a Z-value of the object that caused the overflow is tested against the Z-value of other objects in the buffer. At step 1020, if there are other objects with an equal Z-value, they are discarded. Discarding an object can include a number of techniques including removing from the Z-buffer, or marking the layer as having an open space at that location. Then step 796 is executed. If there are no objects having an equal Z-value, then 796 is executed.

This embodiment will properly retain objects having equal Z-values where the number of objects with equal Z-values is equal to, or less than, the maximum number of layers in the Z-buffer. That is, one layer is used for the composite, the remaining layers are used for objects having equal Z-values. However, if no overflow occurs, this solution can have as many objects with equal Zs as there are layers in the Z-buffer. That is, no layer is needed for a composite object, because no overflow occurred. Note that this embodiment will solve the problem of retaining objects having equal Z-values for a Z-buffer having three layers or more layers.

In this embodiment, like in the general approach described for FIG. 7, the Z-value of the object in the last layer is used for the infinite curtain. That is, the Z-value of the object preceding the equal Z-values is used as the backmost Z-value during the infinite curtain Z composite.

FIG. 11 illustrates an example of an object sort using the method of FIG. 10. At 1100, the Z-buffer is empty and the sort circuit is prepared to receive objects. At 1110, a first object having a Z-value of 1 is received and placed in layer 0. At 1115, a second object, having a Z-value of 0, is received. This object, like the second object of FIG. 9, is placed in layer 0. The first object is moved to layer 1. At 1120, a third object, having a Z-value equal to 2, is received and stored in layer 2. At 1125, a fourth object, having a Z-value equal to 2, is received and stored in layer 3. At 1130, a fifth object, having a Z-value equal to 2, is received. This fifth object causes an overflow.

Assume that only the above five objects are active for the present pixel. As the fifth object had a Z-value equal to 2, all the objects having an equal Z-value are discarded (third and fourth objects). Then a composite of objects one and two is made. The composite, infinite curtain, is assigned the Z-value of the last remaining object. In this case, the infinite curtain is assigned the Z-value equal to 1. This is the Z-value of the object in layer 1.

As no more objects are to be received, and an overflow has occurred, the five objects are resubmitted. The first and second objects are discarded as having Z-values less than, or equal to, the infinite curtain's Z-value. Next the object, received at 1125, is received after the first two objects. That is, this object is not received in the same order as it was received when submitted in the first attempted sort. This object has a Z-value greater than the infinite curtain's Z-value. This object is stored in layer 1. The next object, having a Z-value equal to 2, is stored in layer 2. The next object, having a Z-value equal to 2, is stored in layer 3. Thus, objects having equal Z-values have been retained during the Z-sorting process. These objects have been retained even though they were not resubmitted in the same order.

What is claimed is:

1. A method of retaining objects, each object having a data value indicative of the visual representation of the object and a Z-value, said Z-buffer including a first object having a first data value and first Z-value, said method comprising the steps of:

a) receiving a second object having a second data value and second Z-value;

b) generating a second tag for said second object;

c) storing said second object and said second tag in said Z-buffer;

d) receiving a third object causing an overflow, said third object having a third data value and a third Z-value equal to said second Z-value;

e) generating a fourth object, said fourth object having a fourth data value comprising a composite blend of said first and second data values, said fourth object being stored in said Z-buffer with a fourth tag;

f) resubmitting said third object;

g) receiving said third object;

h) generating a third tag for said third object, and i) storing said third object and said third tag in said Z-buffer responsive to comparing said fourth tag and said third tag.

2. The method of claim 1 wherein said first object is stored with a first tag.

3. The method of claim 1 wherein said second object is received at a first time, and after step e) and prior to step f), performing the following steps:

resubmitting said second object;

receiving said second object at a second time;

generating said second tag for said second object;

discarding said second object responsive to comparing said second tag and said fourth tag.

4. The method of claim 3 wherein a value of said fourth tag is greater than a value of said second tag.

5. The method of claim 1 wherein said first object is marked as a composite, and said first object is not resubmitted.

6. The method of claim 1 wherein said Z-buffer includes a plurality of layers, wherein each layer of said plurality of layers is for storing an object, and wherein said fourth object is stored in a first layer.

7. The method of claim 1 wherein said Z-buffer includes storage locations for four objects, said Z-buffer including a fifth object and a sixth object, and said fourth object including a composite of said first, second, fifth, and sixth objects.

8. The method of claim 7 wherein said fifth and sixth objects are resubmitted.

9. The method of claim 1 wherein said Z-buffer is a scanline Z-buffer.

10. The method of claim 1 wherein said first object and said second object are not opaque.

11. The method of claim 1 wherein said second tag includes a representation of 0 and said third tag includes a representation of 1.

12. A method of retaining objects, having equal Z-values in a Z-buffer, said method comprising the steps of:

detecting an overflow responsive to receiving a first object having a first data value, said Z-buffer storing a plurality of objects, each object of the plurality of objects having a corresponding data value, and a corresponding Z-value, said first object having a Z-value equal to the corresponding Z-value of one object of said plurality of objects;

compositing said stored plurality of objects to generate a composite object responsive to said overflow, said composite object having a composite data value equal to a composite blend of the corresponding data values of the stored plurality of objects, and a composite tag equal to a second tag, said second tag corresponding to a second object of said plurality of objects;

resubmitting all objects to be sorted, responsive to said overflow;

generating a first tag being not equal to said composite tag, responsive to re-receiving said first object;

storing said first object and said first tag in said Z-buffer, responsive to comparing said first tag and said composite tag.

13. The method of claim 12 wherein each object of said plurality of objects is stored with a corresponding tag, and wherein said all objects to be sorted include said second object and said first object.

14. The method of claim 13 wherein said second object's Z-value equals said first object's Z-value, generating a first tag includes the steps of:

generating said first tag not equal to said composite tag responsive to determining said first object's Z-value is equal to said composite object's Z-value.

15. The method of claim 14 wherein said first tag has a value greater than said composite tag.

16. The method of claim 15 wherein after resubmitting all objects to be sorted, the following steps are performed:

said second object is re-received;

generating said second tag for said second object, and said second object is discarded responsive to determining said second tag is equal to said composite tag.

17. The method of claim 16 wherein said Z-buffer includes a plurality of layers, and wherein detecting said overflow responsive to receiving said first object includes the following steps:

determining said second object is in a last layer of said Z-buffer, and determining said second object has a Z-value equal to said first object.

18. The method of claim 16 wherein said objects to be sorted are supplied through a pipeline by an object access control circuit, wherein said compositing is performed by a compositing circuit coupled to said object access control circuit, and wherein said resubmitting all objects to be sorted is performed by said object access control circuit by reassessing said all objects to be sorted and providing said all objects to be sorted to said pipeline.

19. The method of claim 18 wherein said all objects are provided to said pipeline in a predetermined order.

20. An apparatus comprising:
a memory for storing a plurality of objects each object having a corresponding data value;
a Z-buffer, coupled to said memory, for storing objects received from said memory;
an overflow detection circuit, coupled to said Z-buffer, for detecting an overflow condition and asserting an overflow;
a compositing circuit, coupled to said Z-buffer, for generating a composite object responsive to said overflow, said composite object corresponding to all objects stored in said Z-buffer when said overflow occurs and having a composite data value equal to a composite blend of the corresponding data values of the objects stored in the Z-buffer, said compositing circuit further for causing said Z-buffer to store said composite object with a first tag corresponding to a Z-value of one of said objects stored in said buffer when said overflow occurs, and
a tag generating circuit, coupled to said Z-buffer, for generating a different tag for each of said plurality of objects having a Z-value equal to another of said plurality of objects.

21. The apparatus of claim 20 further comprising an pipeline control circuit coupled to said memory and said Z-buffer, said pipeline control circuit for providing said plurality of objects to said Z-buffer, and said pipeline control circuit for resubmitting said plurality of objects responsive to said overflow.

22. The apparatus of claim 20 wherein said overflow detection circuit detects an overflow when said Z-buffer is full and a received object cannot be discarded.

23. The apparatus of claim 20 further comprising a comparison circuit, coupled to said tag generating circuit, for comparing a Z-value of a received object with a Z-value of an object stored in said Z-buffer, said comparison circuit further for discarding a received object responsive to the result of a comparison.

24. The apparatus of claim 23 where said comparison circuit causes a received object to be discarded if the Z-value of said received object is greater than the Z-value of the object stored in the last layer of the Z-buffer
resubmitting said second object;
receiving said second object a second time;
generating said second tag for said second object;
discarding said second object responsive to comparing said second tag and said fourth tag.

25. The apparatus of claim 20 wherein said plurality of objects comprises objects to be sorted for rendering a scanline.

26. A method comprising the steps of:
a) receiving a first object having a first data value and a first Z-value;
b) assigning a corresponding first tag to said first object;
c) storing said first object with said first tag in a Z-buffer;
d) receiving a second object having a second data value and a second Z-value;
e) assigning a corresponding second tag to said second object;
f) storing said second object with said second tag in said Z-buffer;
g) receiving a third object having a third data value and a third Z-value where said third Z-value equals said first Z-value, said third object causing an overflow;
h) compositing objects stored in said Z-buffer to generate a fourth object having a fourth data value equal to a composite blend of data values of objects stored in the Z-buffer;
i) generating a fourth tag corresponding to said fourth object, said fourth tag being equal to said first tag, and
j) resubmitting said first, second and third objects to said Z-buffer, including the steps of
receiving said third object,
assigning a third tag to said third object, wherein said third tag is not equal to said fourth tag, and
storing said third object with said third tag in said Z-buffer.

27. The method of claim 26 further comprising the steps of wherein said resubmitting said first, second, and third objects to said Z-buffer includes:
receiving said first object;
assigning said first tag to said first object;
comparing said first tag with said fourth tag, and as a result, discarding said first object;
receiving said second object;
assigning said second tag to said second object, and
comparing said second tag with said fourth tag, and as a result, discarding said second object.

28. The method of claim 27 wherein said Z-buffer includes locations to store four objects.

29. The method of claim 27 wherein said fourth tag represents a 0 and said third tag represents a 1.

30. A method of retaining objects having equal Z-values in a Z-buffer, said method comprising the steps of:
storing a first object, a second object, and a third object in said Z-buffer, said first object having a first data value and a first Z-value, said second object having a second data value and a second Z-value, said third object having a third data value and a third Z-value, none of said first, second and third Z-values being equal;
receiving a fourth object causing an overflow, said fourth object having a fourth data value and a fourth Z-value, said fourth Z-value being equal to said third Z-value;
compositing all objects in said Z-buffer not having a Z-value equal to said fourth Z-value to generate a fifth object having a fifth data value equal to a composite blend of data values of objects in the Z-buffer, said fifth object having a Z-value not equal to said third Z-value;
resubmitting said third and fourth objects;
receiving said third object;
storing said third object in said Z-buffer;
receiving said fourth object, and
storing said fourth object in said Z-buffer.

31. The method of claim 30 wherein said Z-buffer includes four storage locations, said method including the step of storing a sixth object in said Z-buffer, said sixth object having a sixth data value and a Z-value not equal to said first, second, third, or fourth Z-values, and wherein said step of compositing all objects includes compositing said sixth object.

32. The method of claim 30 wherein said step of resubmitting said third and fourth objects includes resubmitting said first and second objects.

33. The method of claim 30 wherein none of said first, second, third or fourth objects are opaque.

34. The method of claim 30 wherein said second Z-value is greater than said first Z-value and said fifth Z-value equals said second Z-value.

35. The method of claim 34 wherein said third Z-value is greater than said second Z-value.

36. The method of claim 30 wherein said fifth object is a composite.

37. The method of claim 30 wherein after the step of resubmitting said third and fourth objects, said fourth object is received before said third object.

38. The method of claim 30 wherein after the step of resubmitting said third and fourth objects, said third object is received before said fourth object.

39. The method of claim 30 wherein said first, second, and third objects are required by a rendering circuit to render a scanline.

40. An apparatus for retaining objects having equal Z-values in a Z-buffer, said apparatus comprising:

a memory for storing a plurality of objects to be sorted, each object having a corresponding data value;

a Z-buffer, being coupled to said memory, having a plurality of storage locations for storing a first subset of said plurality of objects;

an overflow detect circuit, being coupled to said Z-buffer, for detecting an overflow responsive to a receiving a first object, said first object having a first data value and a first Z-value;

a compositing circuit, being coupled to said Z-buffer, for compositing a first subset of objects of said first subset to generate a composite object responsive to detecting said overflow said composite object having a composite data value equal to a composite blend of corresponding data values of the first subset of objects, said compositing circuit further for causing said Z-buffer to store said composite object, said composite object having a composite Z-value not equal to said first Z-value, said composite Z-value being equal to a Z-value of an object in said subset of objects;

a comparison circuit, being coupled to said Z-buffer, for generating a compare result by comparing the Z-value of each received object to the Z-values of objects in said first subset, and for causing a received object to be discarded if said compare result includes a first value, and for causing a received object to be stored in said Z-buffer if said compare result includes a second value.

41. The apparatus of claim 40 wherein said Z-buffer includes four storage locations.

42. The apparatus of claim 40 wherein said overflow detect circuit detects an overflow if said first object cannot be discarded and said Z-buffer is full.

43. The apparatus of claim 40 wherein said first subsubset of objects includes all objects not having Z-values equal to said first Z-value.

44. The apparatus of claim 40 wherein said composite object is stored in the first storage location of said Z-buffer and wherein said first subset is removed from said Z-buffer responsive to generating said composite object.

45. The apparatus of claim 40 wherein said first value is generated when the Z-value of a received object is less than the Z-value of a composite object stored in said Z-buffer.

46. The apparatus of claim 40 wherein said first subsubset includes objects having a Z-value not equal to said first Z-value.

47. A method of retaining graphic objects in a Z-buffer, each object comprising a data value representative of a visual representation of the object and a Z-value, said Z-buffer including a plurality of objects, each having a Z-value and a data value, said method comprising the steps of:

d) receiving a new object causing an overflow, said new object having a new data value and a Z-value equal to a Z-value of an object of the plurality of objects;

d) generating a composite object, said composite object comprising a composite data value representative of a blending of the data values of the plurality of objects and a composite Z-value representative of the Z-values of the plurality of objects, said composite object being stored in said Z-buffer;

e) removing said plurality of objects from the Z-buffer;

f) resubmitting said new object;

g) receiving said new object; and i) storing said new object in said Z-buffer.

48. The method as set forth in claim 47, wherein the overflow occurs when the Z-buffer is full.

49. The method as set forth in claim 47, wherein step (e) comprises the steps of:

(i) resubmitting each of the plurality of objects; and (ii) for each object of the plurality of objects, generating a tag, and discarding said object responsive to comparing said generated tag and said composite tag.

* * * * *